United States Patent

[11] 3,613,710

| [72] | Inventor | Heinrich Oberthur<br>Offenbach-Rumpenheim, Germany |
|---|---|---|
| [21] | Appl. No. | 873,746 |
| [22] | Filed | Nov. 26, 1969 |
| [45] | Patented | Oct. 12, 1971 |
| [73] | Assignee | Alfred Teves G.m.b.H.<br>Frankfurt/Main, Germany |
| [32] | Priority | Sept. 22, 1966 |
| [33] | | Germany |
| [31] | | T32107 |
| | | Continuation of application Ser. No.<br>668,462, Sept. 18, 1967, now abandoned. |

[54] SWITCHOVER VALVE FOR PNEUMATIC
INSTALLATIONS
6 Claims, 5 Drawing Figs.

[52] U.S. Cl. .................................................. 137/102,
303/40, 303/60
[51] Int. Cl. ........................................................ F16k 15/14
[50] Field of Search ............................................ 137/102

[56] References Cited
UNITED STATES PATENTS

| 2,406,284 | 8/1946 | Fitch | 137/102 |
| 2,507,384 | 5/1950 | Schneck | 137/102 X |
| 2,634,758 | 4/1953 | Ojalvo | 251/333 X |
| 2,669,248 | 2/1954 | Miller | 137/102 X |
| 2,816,563 | 12/1957 | Pappas | 137/102 |
| 2,822,818 | 2/1958 | Breznick | 251/333 X |
| 2,891,569 | 6/1959 | Goodner | 251/333 X |
| 2,960,099 | 11/1960 | Hill | 137/102 |
| 2,989,977 | 6/1961 | Matter | 137/508 X |
| 3,002,520 | 10/1961 | Morse | 137/102 |
| 3,006,694 | 10/1961 | Valentine | 137/102 X |
| 3,114,659 | 12/1963 | Warren | 137/508 X |
| 3,311,124 | 3/1967 | LeGates | 137/508 |

Primary Examiner—Harold W. Weakley
Attorney—Karl F. Ross

ABSTRACT: A fluid-operated switchover valve having an outlet communicating with a gas chamber (e.g. of a charging cylinder for a hydrodynamic brake system), a first inlet communicating with a source of gas (e.g. an air pressure tank or the atmosphere) and another control inlet subjected to reduced pressure (e.g. from a suction reservoir), the valve having a housing forming an elongated bore for a valve piston bearing against a spring with the pressure of the first inlet and a valve member slidable in the piston and cooperating therewith to form a valve with alternatively connects the suction inlet and the air inlet with the chamber.

Heinrich Oberthur
INVENTOR.

BY
Karl F. Ross
Attorney

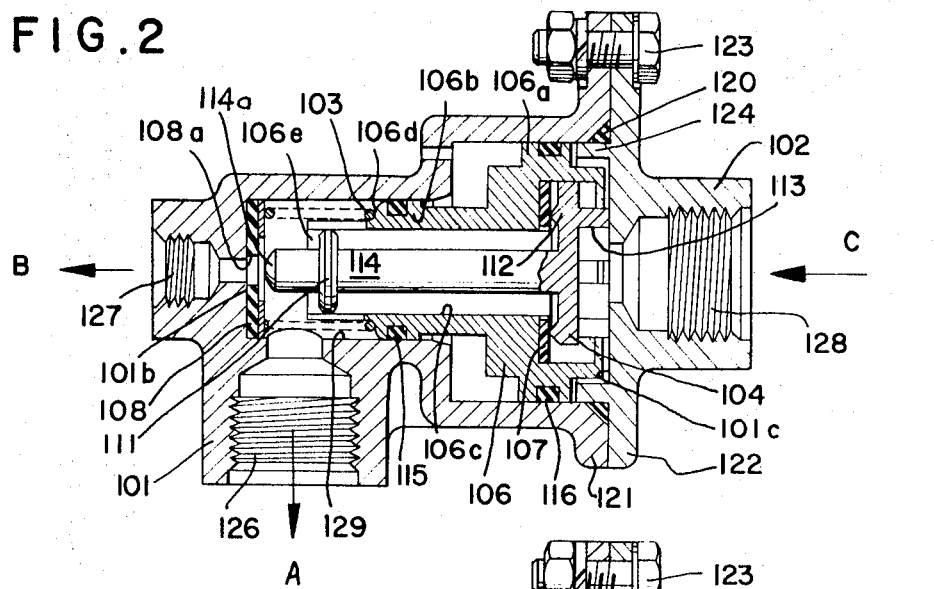
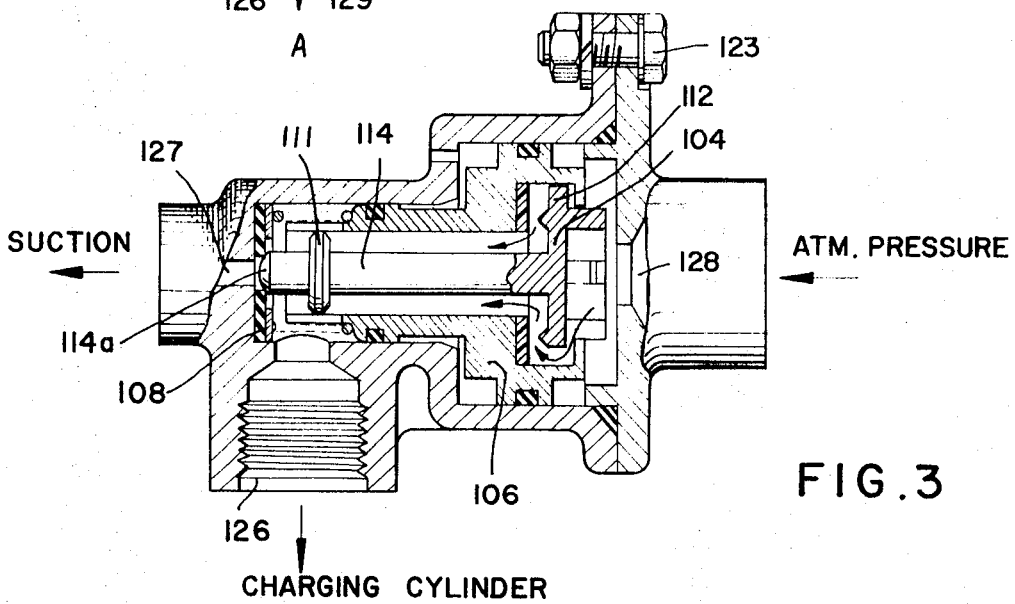

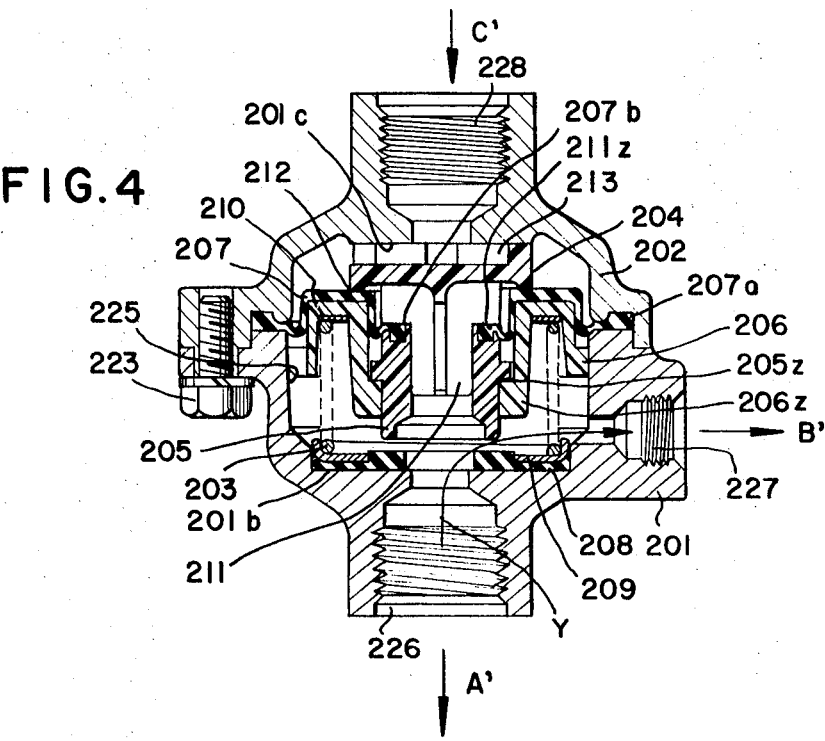
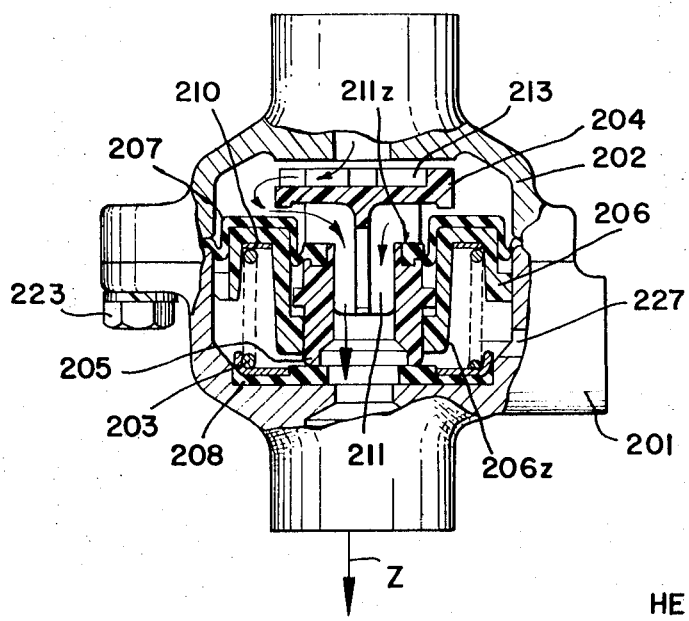

SWITCHOVER VALVE FOR PNEUMATIC INSTALLATIONS

This application is a continuation of application Ser. No. 668,462, filed Sept. 18, 1967, now abandoned.

My present invention relates to a switchover valve for pneumatic and other gas control systems and, more particularly, to a control valve operated by fluid pressure and adapted to alternatively connect a suction source and a pressure source with a gas chamber to be subjected to the influences of these sources.

It has already been proposed to provide fluid-pressure-responsive valves having pistons displaceable under a fluid-pressure differential between alternate positions in which one or another port of the valve communicates with a common port connected with a working member of a pneumatic or hydropneumatic installation.

In the commonly assigned copending application Ser. No. 669,941, filed Sept. 22, 1967, now U.S. Pat. No. 3,449,017, entitled BRAKE SYSTEM, I, together with J. R. Botterill and Hans-Christof Klein, describe and claim a vehicle brake installation having a hydrodynamic brake of the type generally set forth in commonly assigned patents U.S. Pat. No. 3,265,162 of 9 Aug. 1966 and U.S. Pat. No. 3,302,755 of 7 Feb. 1967 or of the prior described systems of U.S. Pats. No. 1,297,225 and 2,241,189. As pointed out in the copending application mentioned earlier, a hydrodynamic brake generally consists of a toroidal or cylindrical shell half connected with the rotating shaft to be braked (e.g. an axle shaft of the automotive vehicle) while a confronting, generally similar shell half is mounted upon a relatively stationary support, e.g. the vehicle chassis. The mutually concave shell halves define an annular chamber whose vanes subdivide it into a plurality of generally segmental compartments receiving a hydraulic fluid. The hydraulic fluid is pumped around the rotor and stator shell members and establishes a pressure differential thereacross, while a transmission line completes with the hydrodynamic brake and a heat exchanger, the braking assembly.

The pressurization of the liquid within the hydrodynamic brake determines the brake efficiency and, even at low speeds in which no pressurization is desired, considerable pumping of the hydraulic fluid continues to the detriment of the fluid and the apparatus itself. Furthermore, the efficiency of hydrodynamic brakes of this character decreases sharply with rotary speed and at relatively low speeds. The hydrodynamic brake is ineffective as a practical matter so that auxiliary friction brakes must be provided. To eliminate the disadvantages of hydraulic pumping when brake operation is not required, the aforementioned copending application provides a novel system for operating the hydrodynamic brake. In that system, the hydrodynamic brake is provided with a fluid-pressure-responsive "accumulator" whose fluid compartment (which may be directly exposed to a gas chamber formed thereabove) communicates with the hydrodynamic brake, selectively energizable by an elevated fluid pressure (at least atmospheric pressure) for normal brake operation but is deenergizable for the "idle" of the hydrodynamic brake by subjecting the charging selector to a negative, i.e. subatmospheric pressure, tending to withdraw fluid from the brake into the charging cylinder. The switchover is effected by a control valve communicating with the brake master cylinder which also operates the friction brake. In addition to this control valve, the system of that application provides a "reversing" or switchover valve between the control valve and the brake-charging cylinder for selectively connecting the suction source and the pressure source with the air chamber of the latter. The present invention relates primarily to switchover valves which are useful in system of these types and the following description may refer to such installations from time to time, it being understood that other pneumatic, hydropneumatic or hydraulic installations may also utilize the valve which basically is a fluid-responsive valve for alternately connecting a negative pressure port and a positive pressure port to a common port to be subjected either to reduced or to elevated pressures.

Since prior art valves performing a similar function have been unduly complex, difficult to assemble, prone to breakdown and are imprecise with respect to the threshold at which switchover occurs, it is the principal object of the present invention to provide an improved valve of the character described obviating the aforementioned disadvantages.

This object and others, which are described in greater detail hereinafter, are attainable, in accordance with the present invention, which provides a switchover valve whose valve body has at least three ports including a first inlet port exposed to a relatively elevated pressure of the atmospheric or superatmospheric level, a second port exposed to a relatively reduced pressure, generally a negative subatmospheric pressure, and a third port communicating with a device to be subjected, in the alternative, to the reduced pressure and to the high pressure of respective sources communicating with the first and second ports, the valve body containing valve means responsive to a change in the pressure differential across the first and second inlet ports and corresponding at least to a predetermined threshold value for substantially instantaneously switching over the connection between one of the sources and the third port while blocking communication between the latter and the other sources.

The valve body according to this invention is provided with a chamber receiving a piston means interposed between the first and second ports and slidable in response to the differential thereacross against the force of a restoring spring which bears upon this piston means in a direction opposite the differential while a valve seat cooperating with the piston is yieldably retained by the spring in the opposite direction. The spring force is selected to be greater than the normal pressure differential therebetween but less than the threshold value at which the switchover is to be effective.

The above and other objects, features and advantages of the present invention will become more readily apparent from the following description, reference being made to the accompanying drawing in which:

FIG. 2 is an axial cross-sectional view of the valve in one operative position;

FIG. 3 is a cross-sectional view of the device of FIG. 2 showing the parts thereof in another operative position;

FIG. 4 is a cross-sectional view of a membrane-type valve embodying the invention; and FIG. 5 is a view similar to FIG. 4 showing the parts thereof in another operative position.

Figure 1:
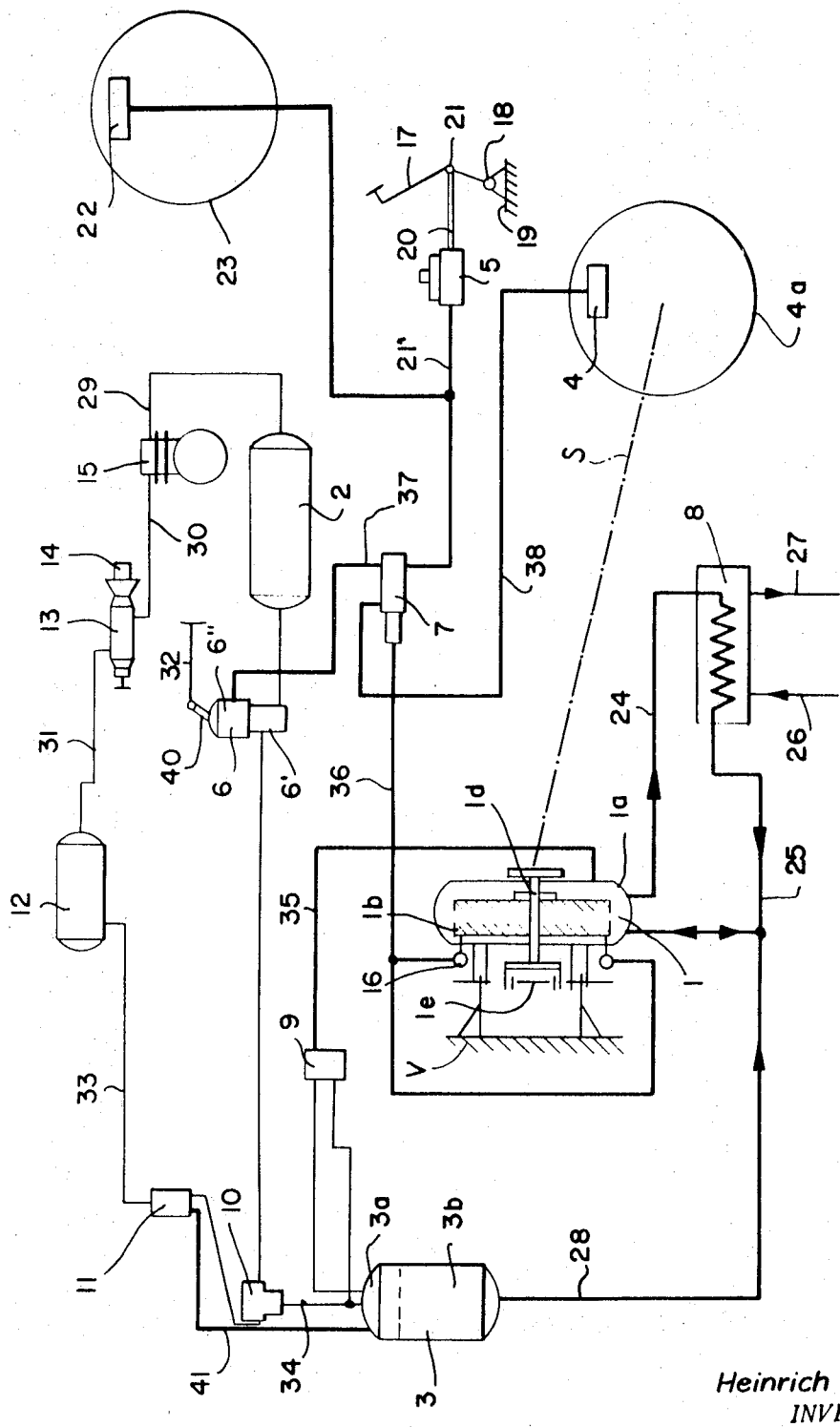
FIG. 1 is a hydraulic circuit diagram of a hydrodynamic brake system provided with a switchover valve in accordance with the present invention.

In FIG. 1, I show a hydrodynamic brake system of the type described and claimed in the aforementioned copending application and which is an example of a system embodying a switchover valve of the type shown in FIGS. 2–6. The brake system of FIG. 1 comprises a hydrodynamic brake 1 whose housing 1a contains a first axially concave generally toroidal vaned member 1b which is affixed to a nonrotatable part of the vehicle V, e.g. its chassis, and confronts an oppositely concave vaned toroidal member 1c coupled with the shaft 1d of the vehicle. This shaft is represented by the dot-dash line S as being diagrammatically coupled with a wheel 4a whose wheel-brake cylinder 4 forms part of a friction brake coordinating with the hydrodynamic brake 1 to bring the vehicle to a standstill. The shaft 1d may be driven by the differential 1e of the power train. During normal brake operation, the brake pedal 17, which is fulcrumed at 18 to the vehicle chassis 19, is depressed to drive the piston rod 20 (articulated at 21 to the brake pedal) to the left and shift the piston within the brake master cylinder 5 to force hydraulic fluid through the conduit 21'. This line also supplies a wheel-brake cylinder 22 whose wheel 23 and axle are not associated with any hydrodynamic brake (e.g. or part of the front wheel system of the vehicle) so that normal mechanical friction brake action occurs at this wheel. The rotation of members 1b and 1c of the hydrodynamic brake 1 circulates hydraulic fluid through the lines 24 and 25 of a cooling circuit including the coil of a heat exchanger 8. A cooling fluid is supplied around this coil and removed via lines 26 and 27 in a circulatory path as described in the aforementioned patents. A pressure accumulator, charging cylinder or hydraulic reservoir 3 is shown to have its upper end 3a supplied with air under pressure or exposed to suction via a switchover valve 10 (FIGS. 2 and 3) while its lower end 3b communicates via line 28 with the hydrodynamic brake 1.

A compressor 15, driven by the engine of the vehicle or a separate motor, has its discharge or elevated pressure port connected via a line 29 to the pressure source of the charging cylinder 3 which is represented by a compressed-air storage tank 2 connected with compressor 15 at the discharge port 29 of the latter. The suction or intake port of the compressor 15, at which the subatmospheric or reduced pressure is generated, communicates via line 30 with an automatic suction bypass valve 13 whose intake 14 opens to the atmosphere via an air filter. This valve, conventional in suction systems in which both the pressure and suction sides of the compressor are used, communicates via line 31 with the reduced pressure source (suction tank 12) of the valve 10. The tank 12 is connected with valve 10 via line 33 and an oil separator 11. The oil separator 11, in which any oil induced to flow upwardly from the charging cylinder 3 toward the suction tank 12 is accumulated and returned thereto via line 41, mechanically traps the oil particles. The gas chamber 3a of charging cylinder 3 communicates also with a pressure-equalizing valve 9 which, in turn, communicates with the hydrodynamic brake 1 via a line 35. As described in U.S. Pat. No. 3,265,162, a feedback arrangement is provided between the hydraulic decelerator or hydrodynamic brake and the control means therefor to ensure that the brake force applied to the shaft S remains constant.

The feedback means may comprise a servofollower represented at 16 and of the type described in the last-mentioned patent. The servofollower communicates via a hydraulic line 36 with the servofollower valve 7 connected between line 21' of the master cylinder 5 and the lines 37 and 38 delivering the brake fluid to the control valve 6 and the wheel-brake cylinder 4, respectively. The control valve 6, whose valve member is received in the valve body 6' and regulates the flow of compressed air from tank 2 through line 39 to the switchover valve 10, has a hydraulically operated cylinder 6" isolated from the pneumatic chamber 6' and provided with a mutually actuatable arm 32 which is able to operate the control valve 6 even when the pedal is not depressed.

When the vehicle is traveling at more or less constant speed with the brake system in a deactuated steady-state condition and no braking is required, the compressor 15 draws air through the valve 13 from the suction tank 12 while forcing air under pressure into the compressed-air tank 2. The reduced pressure at the intake side of the compressor 15 is applied through the tank 12 via lines 33 and the oil separator 11 to the suction port of the valve 10 (side B of the valve of FIGS. 2-5) and transmitted through this valve and line 34 to the gas chamber 3a overlying the hydraulic fluid level within the charging cylinder 3. Since the charging cylinder 3 is here subatmospheric or negative pressure, the hydraulic fluid is drawn inwardly from line 28 and hydrodynamic brake 1 which is thereby rendered ineffective and pumps only insignificant quantities of liquid in the idle condition. As soon as the vacuum in tank 12 and the gas space 3a reaches a predetermined absolute value (as established by the bypass valve 13), i.e. when the pressure falls in tank 12 to a predetermined level, valve 13 shifts to block line 31 and communicates between the filtered intake 14 and the suction port of compressor 15, thereby allowing continuous operation of the latter to nevertheless maintain a substantially constant pressure at the tank 12. Air is pumped into the pressure tank 2 during this period and communication between tank 12 and compressor 15 is only restored when the absolute pressure in tank 12 increases to a level sufficient to trip the valve 13, block the intake 14 and reconnect compressor 15 with tank 12.

When the vehicle is engaged in normal road operation and no brake action is required, the pedal 17 is not depressed and no hydraulic fluid is forced from the master cylinder 5 through the line 21' to either of the wheel-brake cylinders 4 and 21 or to the servocontrol valve 7. The negative pressure in chamber 3a of the charging vessel 3 precludes any pumping action of the hydrodynamic brake 1. When the operator presses upon pedal 17 to shift the piston of master cylinder 5 to the left and thereby force hydraulic fluid into the servocontrol valve 7 and the front wheel brake cylinder 22, initial friction brake action is commenced. The rear wheel brake cylinder 4 is actuated via the servovalve 7 simultaneously with the delivery of hydraulic fluid via line 37 to the dual control valve 6 which is thus hydraulically biased to form a path between the air-pressure tank 2 and the reversing valve 10. As is described in greater detail below with reference to FIGS. 2-5, the latter is actuated by the pressure increase in line 39 to form a path between the air-pressure tank 2 and chamber 3a while blocking communication between the vacuum tank 12 and the vessel 3. The gas-pressurized hydraulic fluid is thus forced via line 28 into the hydrodynamic brake 1 and the latter is thereby rendered effective; hydraulic fluid is now pumped by the relatively rotating members 1b and 1c of the hydrodynamic brake along the circulation path 24, 25 which includes the heat exchanger 8, thereby dissipating the dynamically developed braking heat. The equalizing valve 9 is provided between the outlet side (A in FIGS. 2-5), the charging vessel 3 and the hydrodynamic brake 1 to ensure pressure equality between them. When the hydrodynamic brake is rendered effective, (by pressurization of chamber 3a), the stator 1b receives a reaction force, which is proportional to the brake force and effectiveness and is transferred to the sensor 16; the latter delivers a control movement to the valve member of servovalve 7 (see U.S. Pat. No. 3,265,162). Servovalve 7, in turn, varies the hydraulic pressure applied by line 37 to the control valve 6 and, via line 38, to the wheel-brake cylinder 34 such that the sum of the brake moments of the hydrodynamic brake and the mechanical friction brake corresponds, regardless of the rate of rotation of the shaft 1d, to a predetermined value associated with the extent of depression of the brake pedal 17 and the corresponding braking effectiveness of a totally mechanical brake system. Thus at relatively slow speeds, i.e. when the hydrodynamic brake effectiveness is minimum, the valve 7 permits the full brake force determined by the setting of master cylinder 5 to be applied to the wheel-brake cylinder 4, thereby bringing the vehicle to standstill. When the vehicle is operated at elevated speeds and the hydrodynamic brake is most effective, a brake-actuating depression of pedal 17 gives rise to an increased pressure in the hydrodynamic brake and practically no pressure in the wheel-brake cylinder 4. Control valve 6 may be mutually actuated at 32 for relatively long periods of downhill travel when only hydrodynamic braking is required.

In FIGS. 2 and 3, I show a valve system for use, for example, with the hydrodynamic brake 1, the suction source 12 and the pressure source 2 of FIG. 1. The valve here comprises a housing 101 open axially to the right and closed by a cover 102 which clamps an annular seal 120 thereagainst. The housing 101 and cover 102 have confronting flanges 121 and 122 drawn together via peripherally spaced bolts 123 while an annular boss 124 of the cover 102 extends axially into the cylinder 125 formed by the housing 101. The housing 101 has a port 126 which communicates with the element of the pneumatic system to be subjected to negative or positive pressure, e.g. the charging vessel 3 previously described, as represented by the arrow A. A port 127 communicates, as represented by arrow B, with the negative pressure side of the installation, e.g. with the tank 12, while the cover 102 has a port 128 which receives air at atmospheric or superatmospheric pressure as represented by arrow C. The ports 127 and 128 are disposed coaxially while port 126 has its axis perpendicular to the common axis of the port 127 and 128.

Within the valve body 101, which has a narrow cylinder bore 129 coaxial with cylinder bore 125, there is disposed a piston 106 whose head 106a is formed with an annular seal 116 slidably engaging the wall of the large diameter portion 125 of the cylinder bore. From this head 106a, a shank 106b extends axially into the small diameter chamber 129 which it slidably engages via seal 115. The piston 106 forms with a valve member 114 a shiftable barrier between the pressure side C in the suction side B of the valve. The valve member 114 has a valve plate 104 integral with a plunger line stem whose front end 114a forms a valve with a sealing washer 108 whose bore 108a has a marginal portion defining a seat for the rounded tip 114a of the shank 114. The shank member 104, 114 is axially shiftable within the piston 106 and has an annular guide flange 111 of limited axial extent riding along the wall of an internal bore 106c of the piston, the bore terminating at a transverse face turned toward the pressure side C of the valve body. A sealing washer 107 of elastomeric material is seated in this face of piston 106 and cooperates with an annular V-shaped ridge 112 whose edge is designed to bite into the washer 107 and block communication through the piston 106. A slotted head 113 is milled in the valve plate 104 so that air may pass from the port 128 into the body of the valve even though the plate 104 is urged to the right by the action of a spring 103. The latter engages a valve seat 106d formed at the left-hand end of piston 106 with a slotted cylindrical portion 106e constituting a guide for the compression-type coil spring 103 which reacts against a wear-resistant metallic abutment plate 109, the latter retaining the washer 108 against the end wall 101b of the housing. The effective area of the piston 106 exposed valve the high-pressure side C exceeds the oppositely effective area of the piston exposed to the low-pressure side B.

In the illustrated position of the vale or so-called "low-pressure position," communication is established between the port 127 (i.e. the suction side B) and the port 126 connected to the charging vessel 3 as represented by arrow A. The charging vessel is thus subjected to a reduced pressure and the hydrodynamic valve 1 is relieved of hydraulic fluid. Since the force of spring 103 is greater than the atmospheric pressure or other normal pressure level at port 128, the piston 106 is held in its right-hand extreme position against valve plate 104 which, in turn, abuts the wall 101c of the valve housing; a seal is thus maintained between the ridge 112 and the washer 107. When the pressure at side C rises above atmospheric pressure and the threshold of the valve (FIG. 3), hydraulic fluid biases the piston 106 to the left to bring the rounded tip 114a of the shank 114 into engagement with the washer 108 and close the previously open passage between port 127 and 126. Further movement of the piston 106 to the left lifts the washer 107 away from the ridge 112 of valve plate 104 and establishes communication between the inlet 128 and outlet 126 as represented by arrow X. When the pressure at inlet 128 diminishes to atmospheric, the force of spring 103 overcomes the piston pressure and brings washer 107 into sealing engagement with the ridge 112 and finally lifts the shank 114 from the washer 108 to reestablish the original low-pressure condition. This valve operates solely by virtue of the pressure conditions across ports 127 and 128 and no foreign source or power is necessary.

In the modification illustrated in FIGS. 4 and 5, the sliding piston is replaced by a pistonlike membrane construction and has a port 226 communicating with the charging vessel 3 as represented by arrows A', a port 227 communicating with the suction source (arrow B') and a pressure port 228 communicating with the compressed-air tank (arrow C'). The valve has a valve body 201 formed with the ports 226 and 227 and defining a cylinder bore 225 with a cover 202 which is clamped thereagainst by bolts 223 and sandwiches a membrane 207 between them. In this system, ports 226 and 228 are coaxial while port 227 has an axis at right angles to the common axis of ports 226 and 228.

The port 228 is surrounded by a washer 208 which is held against the end 201b of the bore 225 by a spring 203 and a metallic abutment ring 209. The other side of the helical coil compression spring bears via another abutment ring 210 against a piston 206 which is slidable in the bore 225. The annular membrane 207 has a head 207a locked in a complementary recess between the housing parts 201 and 202 while its inner periphery is formed with a rim 207b received in a sleeve 5 axially shiftable with and relatively to the piston 6 and composed of an elastomeric material. A ridge 212 of the valve plate 204 bears upon the membrane 207 and retains it against a transverse surface of the piston 206; the valve stem 211 of cruciform section guides the sleeve 205. On its upper surface, the valve plate 204 is provided with milled grooves 213 abutting the wall 201c under the force of coil spring 203. In the position illustrated in FIG. 4, i.e. the "low-pressure position," the synthetic resin valve plate 204 is held against surface 201 c while the spring 203 urges the piston 206 upwardly to bring the ridge 212 into sealing engagement with the rubber membrane 207. The sleeve 205 is retained in its uppermost position by an inwardly extending flange 206z which engages the circumferential flange 205z of the sleeve. The upper position of the latter is defined by the stop surface 211z of the shank 211. Thus, communication is established between the port 226 and the suction side of the system (arrow Y) and the charging cylinder 3 is mounted under reduced pressure. The inlet 228 is blocked by the membrane 207. When the pressure increases at port 228, the piston 206 and the membrane 207 are shifted in the direction of washer 208 until the sleeve 205 sealingly engages the latter to block communication between port 226 and 227. The further movement of piston 206 in this direction brings the shank 211 into engagement with the sleeve 205 to lift the valve plate 204 from the membrane 207 and the piston and permit air to flow as represented by arrow Z through the port 226. When the pressure at port 228 decreases, spring 203 initially closes the pressure side C' and reestablishes communication between ports 226 and 227 when further movement of the piston 206 lifts the sleeve 205 from the washer 208.

I claim:
1. A pressure-responsive switchover valve for the alternate connection of a relatively low-pressure source and a relatively high-pressure source with a device operable thereby, said valve comprising:

a housing provided with a first port connectable with said source of relatively high pressure, provided with a second port and a third port, one of said second and third ports being connectable with said device and the other of said second and third ports being connectable with said low-pressure source, and provided with a chamber communicating with said ports, said first, said second and said third ports constituting the sole fluid-connection ports of the valve, said chamber having annular walls surrounding said first and second ports;

piston means including a tubular piston body movably mounted in said chamber between said first and second ports and responsive to a pressure differential thereacross for movement in the direction of said second port by an increase in pressure at said first port beyond a predetermined threshold, said tubular piston body forming a passage between said first and third ports;

an annular generally flat resilient washer surrounding said second port and registering therewith while extending over the entire area of said annular wall surrounding said second port;

an annular rigid disk overlying said washer, said washer forming a valve seat within said disk;

a compression spring in said chamber seated against said disk and bearing upon said piston means for resisting displacement thereof in said direction;

valve means including:
a valve member slidably received in said piston body and extending into said body while maintaining said passage, said valve member being operable upon movement thereof in said direction to block communication between said second and third ports and establish communication between said first and third ports, said valve member being movable jointly with said piston body and independently thereof, said body being formed with a face turned toward said first port and covered with a resilient layer surrounding said passage, a head formed on said member and provided with an annular ridge turned toward said second port and sealingly engaging said resilient layer of said piston body around said passage to prevent fluid flow through said piston body in a position thereof in which said spring retains said piston body against movement, said head being held against said annular wall surrounding said first port in the latter portion, and a slidable element operatively connected to said member and extending transversely to said head and retainable against movement in said direction for lifting said head from said piston body to permit fluid flow around said member through said passage of said piston body upon displacement of said piston body in said direction beyond a predetermined degree; and means sealingly bridging said body and said housing while permitting movement of said body, said spring surrounding said element while yieldably urging said piston body against said head, said head being disengaged from said piston body only upon engagement of said element with said valve seat and said element disengaging said valve seat only upon engagement of said head with said piston body to block said passage.

2. A valve as defined in claim 1 wherein said element is a shank affixed to said valve member.

3. A valve as defined in claim 1 wherein said element is a sleeve engageable with said member.

4. A valve as defined in claim 1 wherein said layer forms an annular membrane anchored at its outer periphery to said housing and resting against said body.

5. A valve as defined in claim 4 wherein said membrane is in continuous sealing engagement with said element.

6. A valve as defined in claim 1 wherein said layer is a w washer seated in said face of said body, said body being provided with annular seals slidably engaging the walls of said chamber.